(12) United States Patent
Ortiz et al.

(10) Patent No.: US 11,355,993 B2
(45) Date of Patent: Jun. 7, 2022

(54) HOUSING INCLUDING SNAP-FIT CONNECTION BETWEEN HOUSING COMPONENTS

(71) Applicants:Robert Bosch Mexico Sistemas Automotrices S.A. de C.V., Toluca (MX); Robert Bosch GmbH, Stuttgart (DE)

(72) Inventors: Luis Angel Ramirez Ortiz, Toluca (MX); Pablo Daniel Molina Cardozo, Toluca (MX); Alex Martin, Karlsruhe (DE)

(73) Assignees: Robert Bosch Mexico Sistemas Automotrices S. A. de C.V., Toluca (MX); Robert Bosch GmbH, Stuttgart (DE)

( * ) Notice: Subject to any disclaimer, the term of this patent is extended or adjusted under 35 U.S.C. 154(b) by 455 days.

(21) Appl. No.: 16/125,933

(22) Filed: Sep. 10, 2018

(65) Prior Publication Data
US 2020/0083775 A1 Mar. 12, 2020

(51) Int. Cl.
| | |
|---|---|
| *H02K 5/22* | (2006.01) |
| *H02K 7/116* | (2006.01) |
| *B60N 2/02* | (2006.01) |
| *H02K 5/06* | (2006.01) |
| *H02K 5/10* | (2006.01) |

(Continued)

(52) U.S. Cl.
CPC ............. *H02K 5/22* (2013.01); *B60N 2/0232* (2013.01); *H02K 7/116* (2013.01); *B60N 2002/0236* (2013.01); *H02K 5/04* (2013.01); *H02K 5/06* (2013.01); *H02K 5/10* (2013.01); *H02K 5/20* (2013.01); *H02K 7/081* (2013.01);
(Continued)

(58) Field of Classification Search
CPC .. H02K 5/04; H02K 5/06; H02K 5/10; H02K 5/20; H02K 7/081; H02K 7/116; H02K 7/1166; H02K 7/145; H02K 2205/00; B60N 2002/0236
USPC ........................................... 310/83, 89, 75 R
See application file for complete search history.

(56) References Cited

U.S. PATENT DOCUMENTS 5,551,589 A * 9/1996 Nakamura ............ E05C 19/066
220/326
5,577,779 A * 11/1996 Dangel ................... E05C 19/06
220/326

(Continued)

*Primary Examiner* — Rashad H Johnson
(74) *Attorney, Agent, or Firm* — Kelly McGlashen; Maginot, Moore & Beck LLP (57) ABSTRACT

A vehicle seat actuator includes an electric motor and a gear set that connects the drive motor to the seat and transmits the output of the motor to the vehicle seat. The drive motor and gear set are each disposed in an individual, dedicated housing component. The individual housing components are then assembled together to provide the actuator. The housing components are maintained in the assembled configuration using snap fit mechanical fasteners. Each snap-fit fastener includes a receiving portion provided on one housing component and an insertion portion provided on the other housing component. The receiving portion may be a slot formed in the gear housing that is partially obstructed by an elastic member, while insertion portion is an ear that protrudes from an outer surface of the drive motor housing and forms both a snap-fit engagement with the elastic member and a press-fit engagement with the slot.

19 Claims, 4 Drawing Sheets

(51) Int. Cl.
*H02K 7/08* (2006.01)
*H02K 5/20* (2006.01)
*H02K 5/04* (2006.01)
*H02K 7/14* (2006.01)

(52) U.S. Cl.
CPC ............ *H02K 7/1166* (2013.01); *H02K 7/145* (2013.01); *H02K 2205/00* (2013.01)

(56) References Cited

U.S. PATENT DOCUMENTS

| | | | | |
|---|---|---|---|---|
| 5,699,601 | A * | 12/1997 | Gilliam | B25B 27/00 |
| | | | | 29/278 |
| 5,878,715 | A * | 3/1999 | Hernandez | F02D 9/02 |
| | | | | 123/184.61 |
| 6,713,913 | B1 * | 3/2004 | Hager | H02K 5/15 |
| | | | | 310/89 |
| 7,791,243 | B2 * | 9/2010 | Mizutani | H01R 39/385 |
| | | | | 310/238 |
| 7,847,449 | B2 * | 12/2010 | Oberle | H02K 7/1166 |
| | | | | 310/154.08 |
| 8,286,533 | B2 * | 10/2012 | Hurst | F16H 57/029 |
| | | | | 74/606 R |
| 9,421,891 | B2 * | 8/2016 | Andres | F16H 37/041 |
| 9,527,619 | B2 | 12/2016 | Patel | |
| 9,927,003 | B2 * | 3/2018 | Qi | H02K 7/1166 |
| 9,969,303 | B2 * | 5/2018 | Ta | B60N 2/0232 |
| 10,359,108 | B1 * | 7/2019 | Ramirez Ortiz | F16B 21/073 |
| 10,400,881 | B1 * | 9/2019 | Ramirez Ortiz | F16H 57/039 |
| 10,523,086 | B2 * | 12/2019 | Dion | H02K 37/24 |
| 10,688,884 | B2 * | 6/2020 | Ortiz | B60N 2/0232 |
| 2004/0070296 | A1 * | 4/2004 | Ursel | H02K 5/148 |
| | | | | 310/90 |
| 2008/0197733 | A1 * | 8/2008 | Oberle | H02K 7/1166 |
| | | | | 310/89 |
| 2009/0194349 | A1 * | 8/2009 | Myers | B62D 1/16 |
| | | | | 180/90 |
| 2011/0057526 | A1 * | 3/2011 | Kokubu | H02K 5/10 |
| | | | | 310/83 |
| 2011/0133584 | A1 * | 6/2011 | Uchimura | H02K 7/1166 |
| | | | | 310/83 |
| 2013/0180357 | A1 * | 7/2013 | Valliere | F16H 57/027 |
| | | | | 74/608 |
| 2013/0233857 | A1 * | 9/2013 | Yang | B65F 1/04 |
| | | | | 220/495.08 |
| 2014/0252897 | A1 * | 9/2014 | Yasumoto | H02K 7/1166 |
| | | | | 310/71 |
| 2014/0260730 | A1 * | 9/2014 | Wu | F16H 25/20 |
| | | | | 74/89.23 |
| 2015/0162798 | A1 * | 6/2015 | Ozawa | H02K 5/161 |
| | | | | 310/43 |
| 2015/0345612 | A1 * | 12/2015 | Baasch | B23K 20/002 |
| | | | | 74/25 |
| 2016/0294247 | A1 * | 10/2016 | Bauer | H02K 5/04 |
| 2017/0089117 | A1 * | 3/2017 | Li | F16H 1/28 |
| 2020/0055424 | A1 * | 2/2020 | Ortiz | B60N 2/0232 |
| 2020/0083775 | A1 * | 3/2020 | Ortiz | B60N 2/0232 |

* cited by examiner

FIG. 1

FIG. 2

HOUSING INCLUDING SNAP-FIT CONNECTION BETWEEN HOUSING COMPONENTS

BACKGROUND

Actuators such as those used to adjust seat position within a vehicle may include an electric motor and a gear set. The gear set connects the drive motor to the vehicle seat, and transmits the output of the motor to the vehicle seat. The drive motor and gear set may be fabricated separately and disposed in individual housing components. The individual housing components are then assembled together to provide the actuator. The housing components are maintained in the assembled configuration using mechanical fasteners such as screws. However, using screws to secure housing elements together may increase the number of parts that form the assembly and increase manufacturing steps and complexity. Increased number of parts and manufacturing complexity results in an increased actuator cost.

A need exists for an actuator housing that has fasteners that securely join the housing components, while reducing the number of parts that form the actuator assembly and reducing manufacturing complexity.

SUMMARY

In some aspects, a housing assembly includes a first housing portion and a second housing portion that is secured to the first housing portion via a fastener. The fastener includes an ear that that protrudes from a sidewall of the first housing portion in a direction perpendicular to the sidewall, a slot that is formed in a housing surface of the second housing portion and an elastic latch that protrudes into the slot so as to at least partially obstruct the slot. When the second housing portion is assembled with the first housing portion, the ear is press fit in the slot and the latch forms a snap-fit engagement with portion of the peripheral edge of the ear in such a way as to prevent withdrawal of the ear from the slot.

In some embodiments, the ear is configured to be inserted into the slot via a relative rotation between the first housing portion and the second housing portion.

In some embodiments, the second housing portion includes an internal vacancy that communicates with the slot, and the latch is cantilevered from a surface of the vacancy in such a way as to protrude into the slot.

In some embodiments, the surface of the vacancy is parallel to and spaced apart from the slot, and the latch is curved and protrudes from the surface in such a way as to overlie the surface.

In some embodiments, the latch is configured to be deflected into the vacancy by the ear when the ear is partially inserted into the slot, and to elastically return to an undeflected configuration when the ear is fully inserted into the slot.

In some embodiments, the latch includes a fixed end that is secured to the second housing portion, a free end that is spaced apart from the fixed end, and a hook portion disposed at the free end, wherein the hook portion protrudes from surface of the latch in such a way as to define a shoulder.

In some embodiments, the latch is an elastic member having an arc shape between a fixed end that is secured to the second housing and a free end that is opposed to the fixed end, the latch including a hook portion at the free end that is configured to engage the peripheral edge of the ear.

In some embodiments, the first housing portion includes a first end that is closed, a longitudinal axis that is perpendicular to the first end, a sidewall that protrudes from and surrounds the first end and is parallel to the longitudinal axis, a second end that is opposed to the first end, and a flange the protrudes outward from the sidewall at the second end. The second housing portion includes a wall structure having an inner surface, an outer surface and a wall structure open end, the wall structure open end facing the first housing portion second end. In addition, the second housing portion includes a pillar that adjoins the wall structure and includes the housing surface. The pillar protrudes beyond the wall structure open end in a direction parallel to the longitudinal axis and includes an end face that is parallel to and spaced apart from the wall structure open end. The pillar is configured so that the housing surface faces the longitudinal axis. The ear includes an enlarged portion of the flange, and the slot is provided in the housing surface of the pillar at an axial location between the wall structure open end and the pillar end face.

In some embodiments, the sidewall comprises a pair of planar sidewall portions joined at each end by a pair of curved sidewall portions, and the ear protrudes outward from the sidewall in a direction away from the longitudinal axis, and is disposed along one curved sidewall portion of the pair of curved sidewall portions. In addition, the wall structure comprises a pair of planar wall portions joined at each end by a pair of curved wall portions, and the pillar is disposed on an outer surface of the wall structure at a location along one curved wall portion of the pair of curved wall portions so as to be longitudinally aligned with the ear.

In some embodiments, the first housing portion includes a closed end, a longitudinal axis that is perpendicular to the closed end, and a sidewall that protrudes from and surrounds the closed end and is parallel to the longitudinal axis. The sidewall includes a pair of planar sidewall portions joined at each end by a pair of curved sidewall portions. The first housing portion also includes an open end that is opposed to the closed end, and a flange the protrudes outward from the sidewall at the open end. The ear protrudes outward from the sidewall in a direction away from the longitudinal axis, and is disposed along one curved sidewall portion of the pair of curved sidewall portions.

In some aspects, a fastener is configured to join a first housing portion to a second housing portion. The fastener includes a receiving portion and an insertion portion that is received in, and engages with, the receiving portion. The insertion portion includes an ear that protrudes from a sidewall of the first housing portion. The ear protrudes in a direction perpendicular to the sidewall. The receiving portion includes a housing surface of the second housing portion. The housing surface is configured to face the sidewall, and the housing surface has a slot formed therein. The receiving portion includes an elastic latch that is disposed in the slot so as to at least partially obstruct the slot. When the insertion portion is assembled with the receiving portion, the ear is press-fit into the slot, and the latch forms a snap-fit engagement with a peripheral edge of the ear in such a way that the ear is prevented from being withdrawn from the slot.

In some embodiments, the fastener is configured so that when the first housing portion and second housing portion are relatively rotated in a first direction about an axis that is parallel to the sidewall, the ear is moved relative to the slot between an initial position in which the ear is positioned external to the slot and in alignment with the slot, and a final position in which the ear is in the slot and the ear is engaged with the latch.

In some embodiments, the first housing and second housing are configured to be relatively rotated in the first direction about the axis that is parallel to the sidewall in such a way that the ear is movable relative to the slot from the initial position, in which a leading edge of the ear is positioned external to the slot and in alignment with the slot, to an intermediate position, in which the ear is in the slot and the leading edge of the ear contacts a ramp portion of the latch and causes the latch to deflect out of the slot. In addition, the ear is movable relative to the slot from the intermediate position to the final position, in which the ear is in the slot and a trailing edge of the ear is engaged with a hook portion of the latch.

In some embodiments, the first housing portion and the second housing portion are configured so that once the ear is moved relative to the slot to the final position, relative rotation of the first housing portion and the second housing portion in a second direction about the axis is prevented via the engagement of the ear with the hook portion, where the second direction is opposed to the first direction.

In some embodiments, the second housing portion includes an internal vacancy that communicates with the slot, and the latch is cantilevered from a surface of the vacancy in such a way as to protrude into the slot.

In some embodiments, the latch is configured to be deflected into the vacancy by the ear when the ear is partially inserted into the slot, and to elastically return to a non-deflected configuration when the ear is fully inserted into the slot.

In some embodiments, the latch is an elastic member having an arc shape between a fixed end that is secured to the second housing and a free end that is opposed to the fixed end. The latch includes a hook portion at the free end that defines a shoulder, and the shoulder is configured to engage an edge of the ear.

In some embodiments, the first housing portion includes a first end that is closed, a longitudinal axis that is perpendicular to the first end, a sidewall that protrudes from and surrounds the first end and is parallel to the longitudinal axis, a second end that is opposed to the first end, and a flange the protrudes outward from the sidewall at the second end. In addition, the second housing portion includes a wall structure having an inner surface, an outer surface and a wall structure open end, the wall structure open end facing the first housing portion second end, and a pillar that adjoins the wall structure and includes the housing surface. The pillar protrudes beyond the wall structure open end in a direction parallel to the longitudinal axis and includes an end face that is parallel to and spaced apart from the wall structure open end. The pillar is configured so that the housing surface faces the longitudinal axis. The ear comprises an enlarged portion of the flange, and the slot is provided in the housing surface of the pillar at an axial location between the wall structure open end and the pillar end face.

In some embodiments, the sidewall comprises a pair of planar sidewall portions joined at each end by a pair of curved sidewall portions. The ear protrudes outward from the sidewall in a direction away from the longitudinal axis, and is disposed along one curved sidewall portion of the pair of curved sidewall portions. The wall structure comprises a pair of planar wall portions joined at each end by a pair of curved wall portions, and the pillar is disposed on an outer surface of the wall structure at a location along one curved wall portion of the pair of curved wall portions so as to be longitudinally aligned with the ear.

In some embodiments, the first housing portion includes a closed end, a longitudinal axis that is perpendicular to the closed end, and a sidewall that protrudes from and surrounds the closed end and is parallel to the longitudinal axis. The sidewall includes a pair of planar sidewall portions joined at each end by a pair of curved sidewall portions. The first housing portion includes an open end that is opposed to the closed end, and a flange the protrudes outward from the sidewall at the open end. The ear protrudes outward from the sidewall in a direction away from the longitudinal axis, and is disposed along one curved sidewall portion of the pair of curved sidewall portions.

In some aspects, an actuator such as those used to adjust seat position within a vehicle includes an electric motor and a gear set that connects the drive motor to the vehicle seat and transmits the output of the motor to the vehicle seat. The drive motor and gear set are each disposed in an individual, dedicated housing component. The individual housing components are then assembled together to provide a housing assembly that houses the actuator. The housing components are maintained in the assembled configuration using snap fit mechanical fasteners. Use of snap-fit mechanical fasteners can be advantageous since the snap fit fastener components may be formed integrally with the corresponding housing components in an injection molding process. In addition, fewer parts are included in the assembly and housing assembly is simple and can be performed without tools.

In some aspects, the snap-fit fastener includes a receiving portion provided on one housing component (for example, the gear housing) and an insertion portion provided on the other housing component (for example, the drive motor housing). The receiving portion may be an elongated slot that is formed in the gear housing and that is partially obstructed by an elastic member that includes a latching feature. The insertion portion may be an ear that protrudes from an outer surface of the drive motor housing. In use, rotation of the drive motor housing relative to the gear housing allows the ear to pass into the slot in a press fitted configuration. When the ear is disposed in the slot, the latching feature of the elastic member engages a trailing edge of the ear and forms a snap-fit engagement with the ear. Advantageously, since the ear is received in the slot in a press-fit configuration, the connection between the gear housing and the drive motor housing is secure and without relative play. Further advantageously, the snap fit engagement of the elastic member with the ear serves to retain the ear within the slot. As a result of these features, the connection between the gear housing and the drive motor housing is strong, durable and reliable.

DETAILED DESCRIPTION

Figure 1:
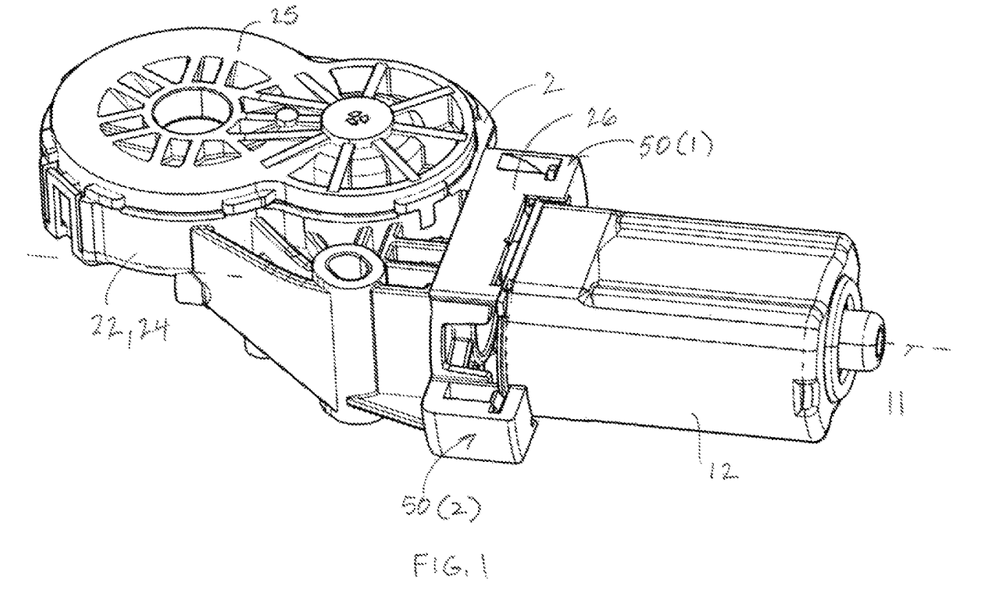
FIG. 1 is a top perspective view of an actuator having an actuator housing that includes a gear housing and a drive motor housing that are connected via a snap-fit fastener.
Figure 2:
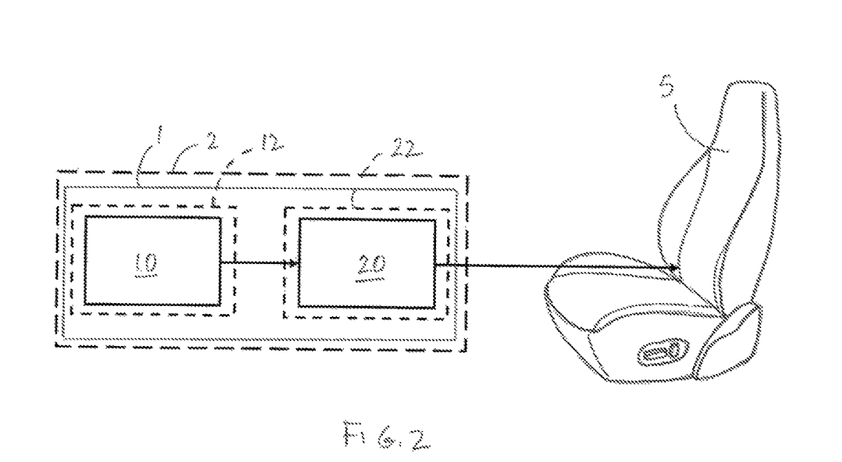
FIG. 2 is a schematic illustration of the actuator of FIG. 1 as configured to actuate a vehicle seat.

Referring to FIGS. 1 and 2, an actuator 1 such as those used to adjust the position of a vehicle seat 5 may include an electric drive motor 10, and a gear set 20 that is disposed between the drive motor 10 and vehicle seat 5. The gear set 20 transmits the output of the drive motor 10 to the vehicle seat 5. The drive motor 10 and the gear set 20 are housed in an actuator housing 2. The actuator housing 2 includes a gear housing 22 that receives the gear set 20 and supports the gear set 20 for rotation. The actuator housing 2 also includes a drive motor housing 12 that is formed separately from the gear housing 22, and is attached thereto during assembly of the actuator 1. The drive motor housing 12 is joined to the gear housing 22 at one end thereof using snap fit mechanical fasteners 50, as discussed in detail below.

In the illustrated embodiment, the actuator housing 2 includes two snap fit mechanical fasteners 50, e.g., a first fastener 50(1) and a second fastener 50(2). The first and second fasteners 50(1). 50(2) are structurally identical, so only one fastener, referred to hereinafter as fastener 50, will be described.

Referring to FIGS. 3-7, the fastener 50 includes an insertion portion 60, and a receiving portion 80 that forms both a snap-fit engagement and a press-fit engagement with the insertion portion 60. In the illustrated embodiment, the insertion portion 60 is provided on the drive motor housing 12, and the receiving portion 80 is provided on the gear housing 22, but the fastener 50 is not limited to this configuration. For example, in other embodiments, the insertion portion 60 may be provided on the gear housing 22, and the receiving portion 80 may be provided on the drive motor housing 12. The insertion portion 60 and the receiving portion 80 will be described in detail below.

Figure 3:
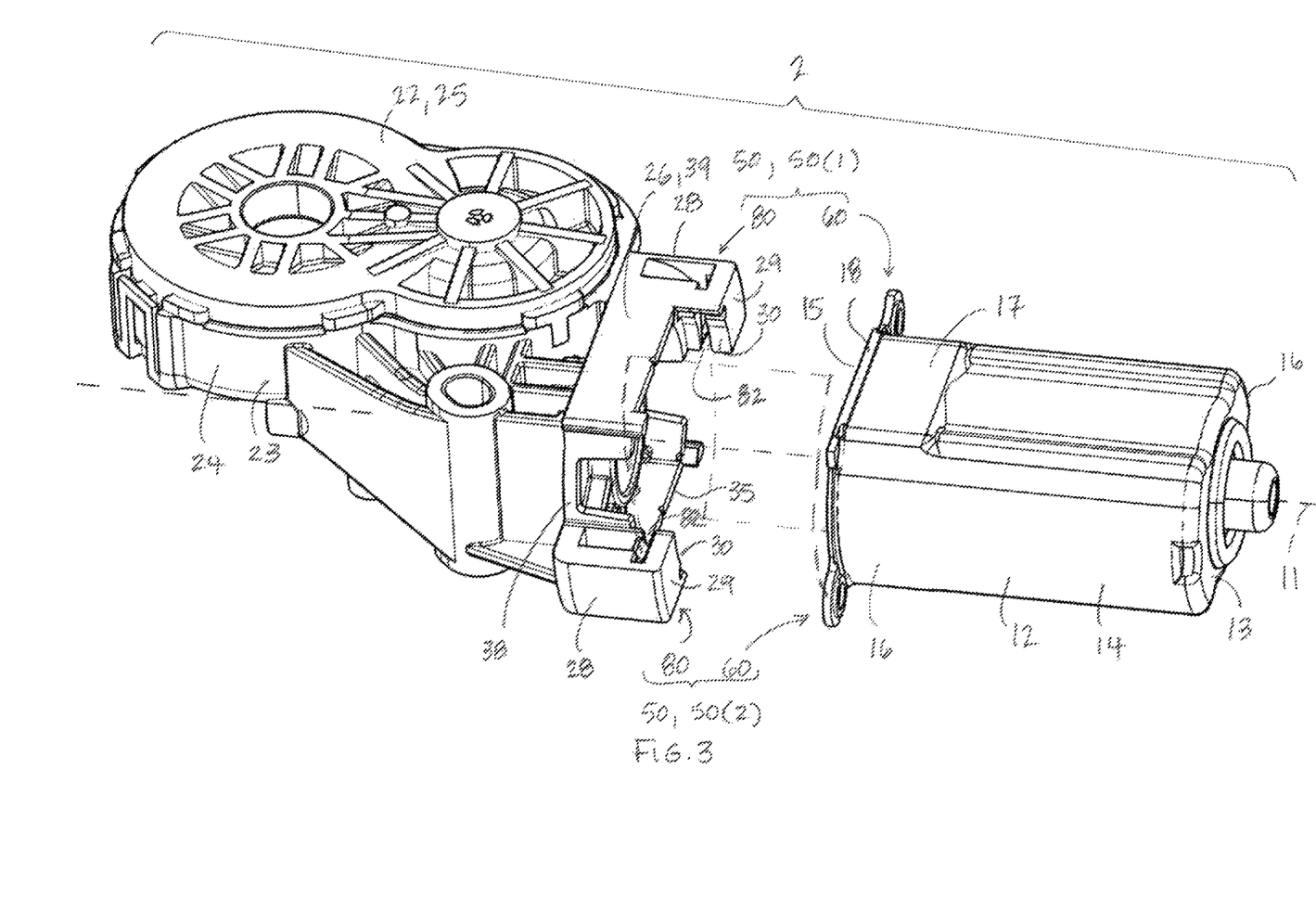
FIG. 3 is an exploded perspective side view of the actuator housing of FIG. 1.
Figure 4:
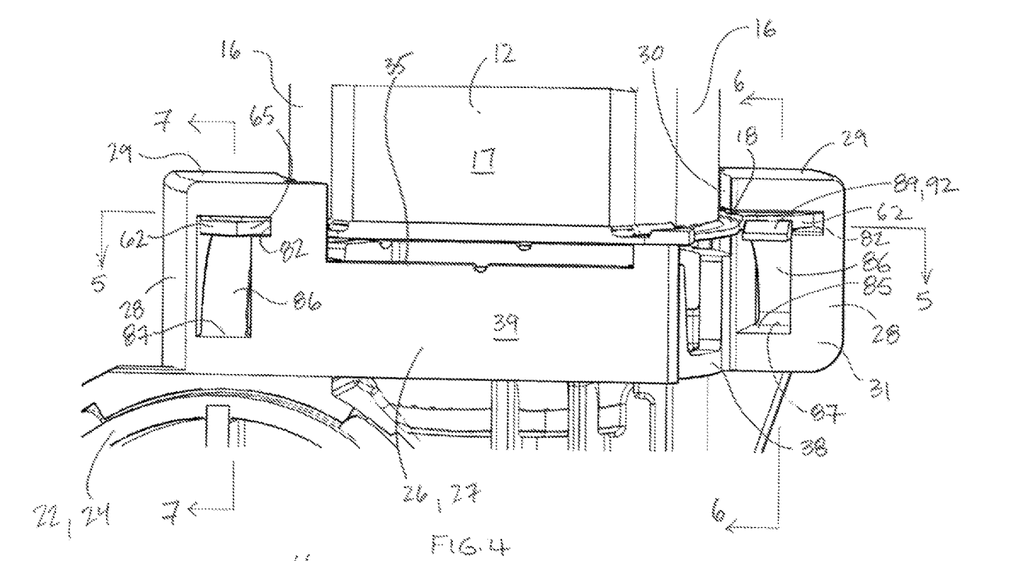
FIG. 4 is a side view of a portion of the actuator housing of FIG. 1.
Figure 5:
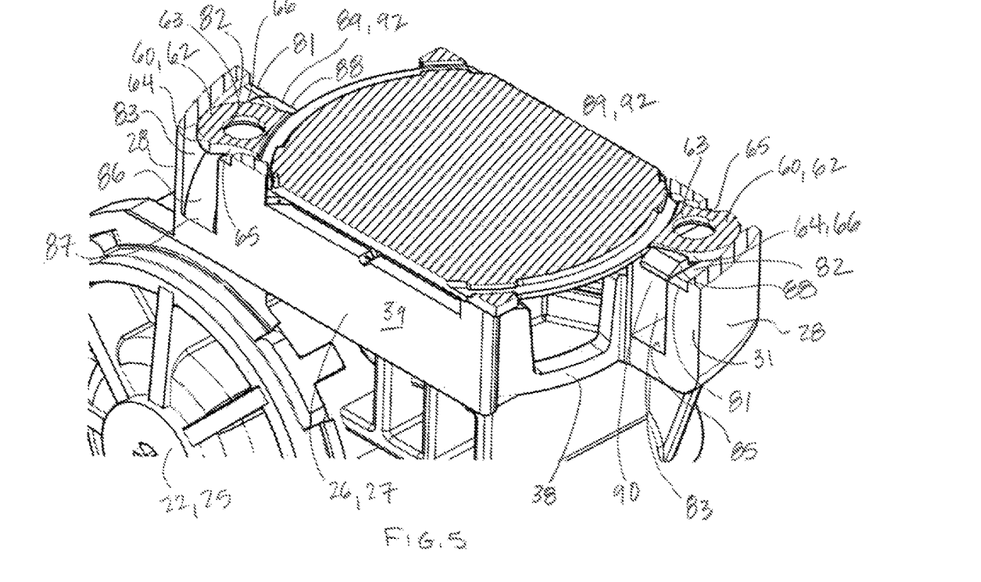
FIG. 5 is a cross-sectional view of the snap-fit fasteners as seen along line 5-5 of FIG. 4.

The drive motor housing 12 is a cup-like enclosure that includes a sidewall 14 having a closed end 13 and an open end 15. The sidewall 14 surrounds a longitudinal axis 11 of the drive motor housing 12, and the longitudinal axis 11 extends between the sidewall open and closed ends 13, 15. The sidewall 14 has four sides that include a pair of outwardly-curved sidewall portions 16 that are joined by a pair of planar sidewall portions 17. The sidewall open end 15 is opposed to the closed end 13, and is surrounded by a flange 18. The flange 18 protrudes outwardly from an outer surface of the sidewall 14 in a direction perpendicular to the longitudinal axis 11. The flange 18 includes a pair of insertion portions 60 of the fasteners 50. The insertion portions 60 are provided on diametrically opposed sides of the sidewall open end 15. In particular, each insertion portion 60 includes an ear 62 that consists of an enlarged portion of the flange 18 that has a generally circular profile when viewed in a direction parallel to the longitudinal axis 11. An ear 62 is provided on the flange 18 along each outwardly-curved sidewall portion 16. Each ear 62 is positioned along the outwardly-curved sidewall portion 16 so as to be adjacent to a planar sidewall portion 17. Each ear 62 has a peripheral edge 64, and a through-hole 63 that is partially surrounded by the ear peripheral edge 64.

The gear housing 22 includes a container 24 that receives the gear set 20, and a cover 25 that closes an open end of the container 24. The gear housing 22 also includes a fixture 26 that is provided at one end of the container 24 and that is configured to enable the gear housing 22 to form a secure and stable connection with the drive motor housing 12. The fixture 26 includes a wall structure 27 that protrudes outward from an outer surface 23 of the container 24 and has a profile or shape that is similar to that of the drive motor housing sidewall 14. In particular, the fixture wall structure 27 has four sides that include a pair of outwardly-curved wall portions 38 that are joined by a pair of planar wall portions 39. In addition, the fixture wall structure 27 has an open end 35 that faces the drive motor housing open end 15, and that is configured to receive and form a connection with the drive motor housing 12 via the fasteners 50. The fixture wall structure 27 also includes a pair of rectangular pillars 28 that are formed on diametrically opposed sides of the fixture wall structure 27. More specifically, a pillar 28 adjoins an outer surface of the fixture wall structure 27 along each outwardly-curved wall portion 38. Each pillar 28 is positioned along the outwardly-curved wall portion 38 so as to be adjacent to a planar wall portion 29. The pillars 28 are positioned so as to be in alignment with the ears 62 of the drive motor housing flange 18 upon assembly of the drive motor housing 12 with the gear housing 22.

In addition, each pillar 28 has an inward-facing surface 30 that faces the longitudinal axis 11. The inward-facing surface 30 is curved to correspond to the curved shape of the outwardly-curved wall portion 38 that it adjoins. Each pillar 28 protrudes beyond the wall structure open end 35 in a direction parallel to the longitudinal axis 11, and each pillar 28 includes an end face 29 that is parallel to and spaced apart from the wall structure open end 35.

Figure 6:
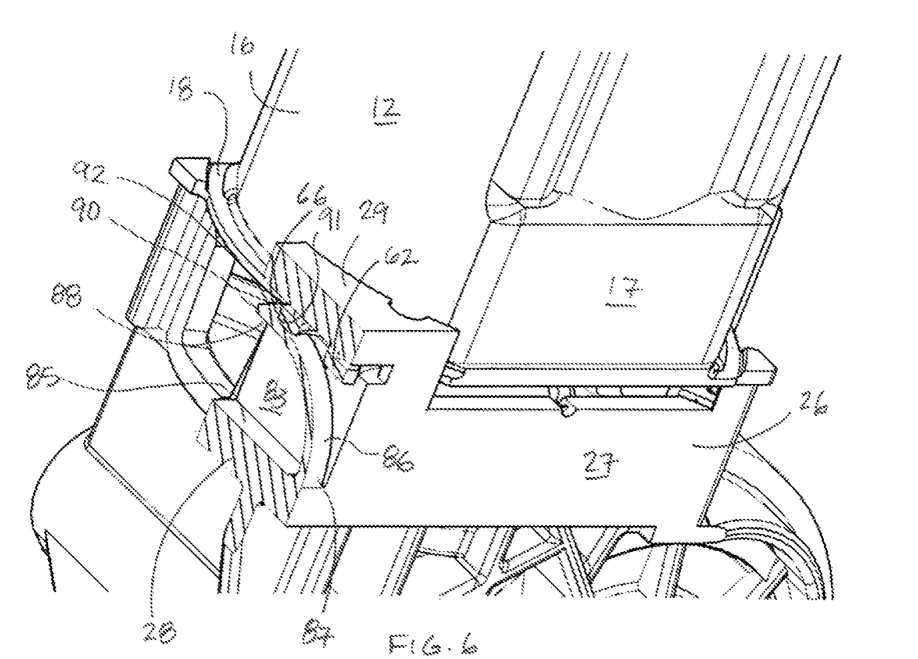
FIG. 6 is a cross-sectional view of one of the snap-fit fasteners as seen along line 6-6 of FIG. 4.
Figure 7:
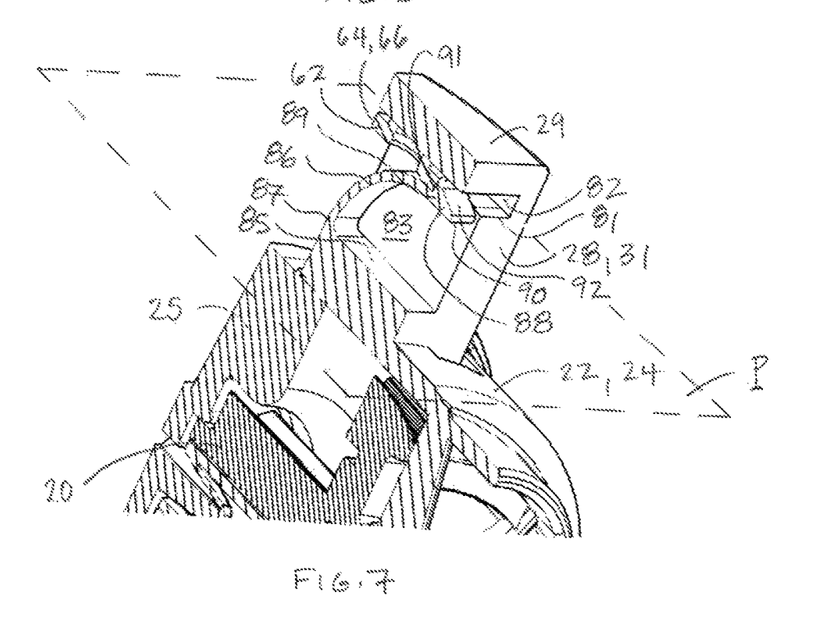
FIG. 7 is a cross-sectional view of the other of the snap-fit fasteners as seen along line 7-7 of FIG. 4.

Each pillar 28 provides a receiving portion 80 of the fastener 50. The receiving portion 80 includes a slot 82 that is formed in the inward-facing surface 30 of the pillar 28, a vacancy 83 that is provided inside the pillar 28 that communicates with the slot 82, and an elastic latch 86 that is disposed in the vacancy 83 in such a way as to protrude into the slot 82 and at least partially obstruct the slot 82. In particular, the slot 82 is provided in the inward-facing surface 30 of the pillar 28 at an axial location between the wall structure open end 35 and the pillar end face 29. As a result, the slot 82 opens facing the drive motor housing 12 and the longitudinal axis 11. The slot 82 is rectangular in shape, and is elongated within a plane P that is perpendicular to the longitudinal axis 11. The slot 82 intersects a lateral surface 31 of the pillar 28, providing a slot inlet 81 in the pillar lateral surface 31. The slot 82 is shaped and dimensioned to receive the ear 62 in a press-fit manner. For example, the dimensions of the slot 82 and the ear 62, in a direction parallel to the longitudinal axis 11, are set so that the slot 82 to forms an interference fit with the ear 62.

The pillar 28 includes an inner surfaces that define the vacancy 83 in such a way that the vacancy 82 terminates at a blind end 85. The blind end 85 forms a bottom surface of the vacancy 83 with respect to the orientation of the actuator 1 shown in FIG. 6, is spaced apart from the slot 82 and extends in parallel to the plane P.

The latch 86 is an elongate, curved member having a fixed end 87 that protrudes from the vacancy blind end 85. In addition, the latch 86 has a free end 88 that is opposed to the fixed end 87. In some embodiments, the latch 86 is cantilevered from the blind end 85 in such a way that latch 86 overlies the blind end 85 and the free end 88 protrudes into the slot 82. The latch 86 has a varying thickness at the free end 88 whereby a hook portion 89 is defined at the latch free end 88. The hook portion 89 includes an angled surface 92 extends between a hook tip 90 that defines a terminus of the latch 86 and a hook shoulder 91. The hook shoulder 91 protrudes from a surface of the latch 86, and is configured to engage the peripheral edge 64 of the ear 62, as discussed further below. The latch 86 is oriented within the vacancy 83 such that the hook portion 89 resides within the slot 82 with the hook tip 90 disposed in the slot inlet 81. The latch 86 is sufficiently elastic to be deflected into the vacancy 83 by the ear 62 when the ear 62 is partially inserted into the slot 82, and to elastically return to an non-deflected configuration when the ear 62 is fully inserted into the slot 82, as discussed further below. In addition, the latch 86 is sufficiently rigid to engage the ear peripheral edge 64 upon full insertion of the ear 62 into the slot 82, and to prevent the ear 62 from retracting from the slot 82.

During assembly of the drive motor housing 12 with the gear housing 22, the drive motor housing 12 is arranged so that the open end 15 of the drive motor housing sidewall 14 faces the fixture wall structure open end 35. In addition, each ear 62 is positioned adjacent to a slot inlet 81 of a corresponding pillar 28. The gear housing 22 and the drive motor housing 12 are then relatively rotated about the longitudinal axis 11 in a first direction (for example, a counter clockwise direction when viewed in a direction parallel to the longitudinal axis 11), whereby each ear 62 is inserted into the respective slot inlet 81. Since the hook portion 89 resides within the slot 82 with the hook tip 90 disposed in the slot inlet 81, as the ear 62 advances into the slot 82, the leading edge portion 65 of the ear peripheral edge 64 contacts the hook portion angled surface 92 and urges the latch 86 to deflect toward the vacancy blind end 85. The deflection of the latch 86 allows the ear 62 pass over the hook portion 89 and to enter the slot 82. As the gear housing 22 and the drive motor housing 12 are relatively rotated about the longitudinal axis 11 in the first direction, the ear 62 moves relative to the slot 82 from the slot inlet 81 to a location in which the ear 62 is fully disposed within the slot 82. When the ear 62 is fully disposed within the slot 82, the latch 86 elastically returns to an non-deflected configuration, in which the hook portion 89 is disposed in the slot 82. In this configuration, the shoulder 91 of the latch hook portion 89 engages the trailing edge portion 66 of the ear peripheral edge 64. Since the shoulder 91 is engaged with the ear peripheral edge 64, relative rotation of the drive motor housing 12 and the gear housing 22 in a second direction about the longitudinal axis 11 is prevented, where the second direction is opposed to the first direction (for example, a clockwise direction when viewed in the same direction parallel to the longitudinal axis 11). In addition, when the drive motor housing 12 is assembled with the gear housing 22, the ear 62 is press fit in the slot 82, which serves to further prevent withdrawal of the ear 62 from the slot 82 as well as provide a secure attachment a between the housings 12, 22 that is free of play.

In the illustrated embodiment, the actuator housing 2 includes two snap-fit fasteners 50(1) and 50(2). It is understood, however, that a greater or fewer number of fasteners 50 can be used to join housing components together, and the number of snap-fit fasteners 50 used is determined by the requirements of the specific application.

Selective illustrative embodiments of the housing and fasteners are described above in some detail. It should be understood that only structures considered necessary for clarifying the housing and fasteners have been described herein. Other conventional structures, and those of ancillary and auxiliary components of the housing and fasteners, are assumed to be known and understood by those skilled in the art. Moreover, while a working example of the housing and fasteners have been described above, the housing and fasteners are not limited to the working examples described above, but various design alterations may be carried out without departing from the housing and fasteners as set forth in the claims.

We claim:

1. A housing assembly comprising a first housing portion and a second housing portion that is secured to the first housing portion via a fastener, wherein
the fastener comprises:
an ear that that protrudes from a sidewall of the first housing, portion in a direction perpendicular to the sidewall;
a slot that is formed in a housing surface of the second housing portion; and
an elastic latch that protrudes into the slot so as to at least partially obstruct the slot,
the second housing portion includes an internal vacancy that communicates with the slot, and the latch is cantilevered from a surface of the vacancy in such a way as to protrude into the slot, and
when the second housing portion is assembled with the first housing portion, the ear is press fit in the slot and the latch forms a snap-fit engagement with a portion of the peripheral edge of the ear in such a way as to prevent withdrawal of the ear from the slot.

2. The housing assembly of claim 1, wherein the ear is configured to be inserted into the slot via a relative rotation between the first housing portion and the second housing portion.

3. The housing assembly of claim 1, Wherein the surface of the vacancy is parallel to and spaced apart from the slot, and the latch is curved and protrudes from the surface in such a way as to overlie the surface.

4. The housing assembly of claim 1, wherein the latch is configured to be deflected into the vacancy by the ear when the ear is partially inserted into the slot, and to elastically return to an undeflected configuration when the ear is fully inserted into the slot.

5. The housing assembly of claim 1, wherein the latch includes a fixed end that is secured to the second housing portion, a free end that is spaced apart from the fixed end, and a hook portion disposed at the free end, wherein the hook portion protrudes from surface of the latch in such a way as to define a shoulder.

6. The housing assembly of claim 1, wherein the latch is an elastic member having an arc shape between a fixed end that is secured to the second housing and a free end that is opposed to the fixed end, the latch including a hook portion at the free end that is configured to engage the peripheral edge of the ear.

7. The housing assembly of claim 1, wherein
the first housing portion includes
a first end that is closed,
a longitudinal axis that is perpendicular to the first end,
a sidewall that protrudes from and surrounds the first end and is parallel to the longitudinal axis,
a second end that is opposed to the first end, and
a flange the protrudes outward from the sidewall at the second end,
the second housing portion includes
a wall structure having an inner surface, an outer surface and a wall structure op end, the wall structure open end facing the first housing portion second end, and
a pillar that adjoins the wall structure and includes the housing surface, the pillar protruding beyond the wall structure open end in a direction parallel to the longitudinal axis and including an end face that is parallel to and spaced apart from the wall structure open end, the pillar being configured so that the housing surface faces the longitudinal axis, and wherein the ear comprises an enlarged portion of the flange, and the slot is provided hi the housing surface of the pillar at an axial location between the wall structure open end and the pillar end face.

8. The housing assembly of claim 7, wherein the sidewall comprises a pair of planar sidewall portions joined at each end by a pair of curved sidewall portions, the ear protrudes outward from the sidewall hi a direction away from the longitudinal axis, and is disposed along one curved sidewall portion of the pair of curved sidewall portions, the wall structure comprises a pair of planar wall portions joined at each end by a pair of curved wall portions, and the pillar is disposed on an outer surface of the wail structure at a location along one curved wall portion of the pair of curved wall portions so as to be longitudinally aligned with the ear.

9. The housing assembly of claim 1, wherein the first housing portion includes a closed end, a longitudinal axis that is perpendicular to the closed end, the sidewall that protrudes from and surrounds the closed end and is parallel to the longitudinal axis, the sidewall comprising a pair of planar sidewall portions joined at each end by a pair of curved sidewall portions, an open end that is opposed to the closed end, and a flange the protrudes outward from the sidewall at the open end, and wherein the ear protrudes outward from the sidewall in a direction away from the longitudinal axis, and is disposed along one curved sidewall portion of the pair of curved sidewall portions.

10. A fastener configured to join a first housing portion to a second housing portion, the fastener comprising a receiving portion and an insertion portion that is received in and engages with, the receiving portion, wherein the insertion portion includes an ear that protrudes from a sidewall of the first housing portion, the ear protruding in a direction perpendicular to the sidewall, the receiving portion includes:

a housing surface of the second housing portion, the housing surface configured to face the sidewall, the housing surface having a slot formed therein; and an elastic latch disposed in the slot so as to at least partially obstruct the slot, the second housing portion includes an internal vacancy that communicates with the slot, and the latch is cantilevered from a surface of the vacancy in such a way as to protrude into the slot, and when the insertion portion is assembled with the receiving portion,. the ear is press-fit into the slot, and the latch forms a snap-fit engagement with a peripheral edge of the ear in such a way that the ear is prevented from being withdrawn from the slot.

11. The fastener of claim 10, wherein the fastener is configured so that when the first housing portion and second housing portion are relatively rotated in a first direction about an axis that is parallel to the sidewall, the ear is moved relative to the slot between an initial position in which the ear is positioned external to the slot and in alignment with the slot, and a final position in which the ear is in the slot and the ear is engaged with the latch.

12. The fastener of claim 11, wherein the first housing and second housing are configured to be relatively rotated in the first direction about the axis that is parallel to the sidewall in such a way that the ear is movable relative to the slot from the initial position in which a leading edge of the ear is positioned external to the slot and in alignment with the slot to an intermediate position in which the ear is in the slot and the leading edge of the ear contacts a ramp portion of the latch and causes the latch to deflect on of the slot, and from the intermediate position to the final position in which the ear is in the slot and a trailing edge of the ear is engaged with a hook portion of the latch.

13. The fastener of claim 11, wherein the first housing portion and the second housing portion are configured so that once the ear is moved relative to the slot to the final position, relative rotation of the first housing portion and the second housing portion in a second direction about the axis is prevented via the engagement of the ear with a hook portion of the latch, where the second direction is opposed to the first direction.

14. The fastener of claim 10, wherein the latch is configured to be deflected into the vacancy by the ear when the ear is partially inserted into the slot, and to elastically return to a non-deflected configuration when the ear is fully inserted into the slot.

15. The fastener of claim 10, wherein the latch is an elastic member having an arc shape between a fixed end that is secured to the second housing and a free end that is opposed to the fixed end, the latch including a hook portion at the free end that defines a shoulder that is configured to engage an edge of the ear.

16. The fastener of claim 10, wherein the first housing portion includes a first end that is closed, a longitudinal axis that is perpendicular to the first end, a sidewall that protrudes from and surrounds the first end and is parallel to the longitudinal axis, a second end that is opposed to the first end, and a flange the protrudes outward from the sidewall at the second end, the second housing portion includes a wall structure having an inner surface, an outer surface and a wall structure open end, the wall structure open end facing the first housing portion second end, and a pillar that adjoins the wall structure and includes the housing surface, the pillar protruding beyond the wall structure open end in a direction parallel to the longitudinal axis and including an end face that is parallel to and spaced apart from the wall structure open end, the pillar being configured so that the housing surface faces the longitudinal axis, and wherein the ear comprises an enlarged portion of the flange, and the slot is provided in the housing surface of the pillar at an axial location between he wall structure open end and the pillar end face.

17. The fastener of claim 16, wherein the sidewall comprises a pair of planar sidewall portions joined at each end by a pair of curved sidewall portions, the ear protrudes outward from the sidewall in a direction away from the longitudinal axis, and is disposed along one curved sidewall portion of the pair of curved sidewall portions, the wall structure comprises a pair of planar wall portions joined at each end by a pair of curved wall portions, and the pillar is disposed on an outer surface of the wall structure at a location along one curved wall, portion of the pair of curved wall portions so as to be longitudinally aligned with the ear.

18. The fastener of claim 10, wherein the first housing portion includes a closed end, a longitudinal axis that is perpendicular to the closed end, the sidewall that protrudes from and surrounds the closed end and is parallel to the longitudinal axis, the sidewall comprising a pair of planar sidewall portions joined at each end by a pair of curved sidewall portions, an open end that is opposed to the closed end, and a flange the protrudes outward from the sidewall at the open end, and wherein the ear protrudes outward from the sidewall in a direction away from the longitudinal axis, and is disposed along one curved sidewall portion of the pair of curved sidewall portions.

19. A fastener configured to join a first housing portion to a second housing portion, the fastener comprising a receiving portion and an insertion portion that is received in, and engages with, the receiving portion, wherein the insertion portion includes an ear that protrudes from a sidewall of the first housing portion, the ear protruding in a direction perpendicular to the sidewall, the receiving portion includes:

a housing surface of the second housing portion, the housing surface configured to face the sidewall, the housing surface having a slot formed therein; and an elastic latch disposed in the slot so as to at least partially obstruct the slot, the latch being an elastic member having an arc shape between a fixed end that is secured to the second housing and a free end that is opposed to the fixed end, the latch including a hook portion at the free end that defines a shoulder that is configured to engage an edge of the ear, and when the insertion portion is assembled with the receiving portion, the ear is press-fit into the slot, and the latch forms a snap-fit engagement with a peripheral edge of the ear in such a way that the ear is prevented from being withdrawn from the slot.

\* \* \* \* \*

UNITED STATES PATENT AND TRADEMARK OFFICE
CERTIFICATE OF CORRECTION

PATENT NO. : 11,355,993 B2
APPLICATION NO. : 16/125933
DATED : June 7, 2022
INVENTOR(S) : Ortiz et al.

It is certified that error appears in the above-identified patent and that said Letters Patent is hereby corrected as shown below:

In the Claims

In Claim 1:
At Column 8, Line 10: "an ear that that protrudes" should read --an ear that protrudes--.

In Claim 7:
At Column 8, Line 58: "a flange the protrudes" should read --a flange that protrudes--; and
At Column 8, Line 62: "a wall structure op end" should read --a wall structure open end--.

In Claim 8:
At Column 9, Line 12: "the sidewall hi a direction" should read --the sidewall in a direction--; and
At Column 9, Lines 18-19: "the wail structure" should read --the wall structure--.

In Claim 9:
At Column 9, Line 31: "a flange the protrudes" should read --a flange that protrudes--.

In Claim 10:
At Column 9, Lines 39-40: "an insertion portion that is received in and engages with, the receiving portion" should read --an insertion portion that is received in, and engages with, the receiving portion--.

In Claim 12:
At Column 10, Lines 9-10: "to deflect on of the slot" should read --to deflect out of the slot--.

In Claim 16:
At Column 10, Line 57: "he wall structure open end" should read --the wall structure open end--.

In Claim 17:
At Column 11, Line 57: "one curved wall, portion of" should read --one curved wall portion of--.

Signed and Sealed this
First Day of August, 2023

Katherine Kelly Vidal
*Director of the United States Patent and Trademark Office*

In Claim 18:
At Column 11, Line 14: "a flange the protrudes" should read --a flange that protrudes--.